United States Patent
Goyal et al.

(10) Patent No.: US 10,631,165 B1
(45) Date of Patent: Apr. 21, 2020

(54) SYSTEMS AND METHODS FOR UPDATING LOCKED STATES OF COMPUTING SYSTEMS

(71) Applicant: CA, Inc., San Jose, CA (US)

(72) Inventors: Bittu Goyal, Bangalore (IN); Pradeep Deshala, Hyderabad (IN); Sandip Kothari, Bangalore (IN); Sunil Kumar, Bangalore (IN)

(73) Assignee: CA, Inc., San Jose, CA (US)

( * ) Notice: Subject to any disclaimer, the term of this patent is extended or adjusted under 35 U.S.C. 154(b) by 147 days.

(21) Appl. No.: 15/485,517

(22) Filed: Apr. 12, 2017

(51) Int. Cl.
| | | |
|---|---|---|
| *H04W 12/08* | (2009.01) | |
| *H04W 4/02* | (2018.01) | |
| *H04B 17/318* | (2015.01) | |
| *H04L 29/06* | (2006.01) | |

(52) U.S. Cl.
CPC .......... *H04W 12/08* (2013.01); *H04B 17/318* (2015.01); *H04L 63/107* (2013.01); *H04W 4/023* (2013.01)

(58) Field of Classification Search
CPC ....... H04W 12/08; H04W 4/023; H04W 4/02; H04L 63/107; H04L 29/06; H04B 17/318
USPC .......................................... 726/6, 1, 2, 4, 17
See application file for complete search history.

(56) References Cited

U.S. PATENT DOCUMENTS

| | | | | |
|---|---|---|---|---|
| 10,231,128 | B1 * | 3/2019 | Ziraknejad | ............ H04L 9/0825 |
| 2015/0105029 | A1 * | 4/2015 | Russell | ................... H04W 4/80 |
| | | | | 455/67.11 |
| 2015/0277428 | A1 * | 10/2015 | Dackefjord | .............. G07C 3/04 |
| | | | | 700/180 |
| 2015/0295901 | A1 * | 10/2015 | Woodward | ............ H04W 12/06 |
| | | | | 713/168 |
| 2016/0035213 | A1 * | 2/2016 | Choi | ...................... H04L 63/107 |
| | | | | 340/669 |

OTHER PUBLICATIONS

Bluetooth Blog; Proximity and RSSI; Sep. 21, 2015; https://blog.bluetooth.com/proximity-and-rssi.
What is Bluetooth?; As accessed on Mar. 31, 2017; https://www.bluetooth.com/what-is-bluetooth-technology/how-it-works.

* cited by examiner

*Primary Examiner* — Ashokkumar B Patel
*Assistant Examiner* — Quazi Farooqui
(74) *Attorney, Agent, or Firm* — FisherBroyles, LLP

(57) ABSTRACT

The disclosed computer-implemented method for updating locked states may include (i) identifying a computing system and a mobile device that are both operated by a user, (ii) using a signal strength between the computing system and the mobile device to calculate a physical distance between the mobile device and the computing system that correlates to a proximity of the user to the computing system, (iii) calibrating, based on input from a sensor that indicates an activity of the user, a parameter for calculating the physical distance, (iv) using the signal strength and the parameter to recalculate the physical distance, and (v) updating, based at least in part on the recalculated physical distance, a locked state of the computing system in response to a change in the proximity of the user to the computing system. Various other methods, systems, and computer-readable media are also disclosed.

20 Claims, 7 Drawing Sheets

SYSTEMS AND METHODS FOR UPDATING LOCKED STATES OF COMPUTING SYSTEMS

BACKGROUND

Security is often described as a continuum between convenience and safety. A system that requires ten layers of authentication may be very difficult to attack, but it may also be so inconvenient that it will never be used. At the opposite end, a system with no means of authentication or authorization is highly convenient for users but also highly insecure. Many computing systems are equipped with a lock function that enables users to lock the computing system while they are not using it, making it more difficult for unauthorized users to access the computing system. Some computing systems are configured with automatic locking systems that will lock the computing system whenever a user is idle for too long. Forcing legitimate users to manually unlock the computing system before regaining access most of the computing system's functions and/or data increases security, but may be inconvenient or annoying for users.

Some systems for updating the locked states of computing systems may attempt to automatically lock the computing system whenever a user moves away from the computing system and/or unlock the computing system whenever the user comes within a certain distance of the computing system. Unfortunately, some traditional systems for automatic proximity detection may rely on unreliable metrics to predict user location, causing false positives and/or false negatives that can annoy users and reduce the security of computing systems by updating locked states at inappropriate times. The instant disclosure, therefore, identifies and addresses a need for systems and methods for updating locked states.

SUMMARY

As will be described in greater detail below, the instant disclosure describes various systems and methods for updating locked states.

In one example, a computer-implemented method for updating locked states may include (i) identifying a computing system and a mobile device that are both operated by a user, (ii) using a signal strength between the computing system and the mobile device to calculate a physical distance between the mobile device and the computing system that correlates to a proximity of the user to the computing system, (iii) calibrating, based on input from at least one sensor on at least one of the computing system and the mobile device that indicates an activity of the user, a parameter for calculating the physical distance between the mobile device and the computing system based on the signal strength, (iv) using the signal strength and the parameter to recalculate the physical distance between the mobile device and the computing system that correlates to the proximity of the user to the computing system, and (v) updating, based at least in part on the recalculated physical distance between the mobile device and the computing system, a locked state of the computing system in response to a change in the proximity of the user to the computing system.

In some examples, using the signal strength between the computing system and the mobile device to calculate the physical distance between the mobile device and the computing system may include calculating a physical distance that correlates to a proximity that exceeds a predetermined threshold for user distance from the computing system, using the signal strength and the parameter to recalculate the physical distance between the mobile device and the computing system may include calculating a physical distance that correlates to a proximity that does not exceed the predetermined threshold for user distance from the computing system, and updating the locked state of the computing system may include avoiding locking the computing system in response to calculating the physical distance that correlates to the proximity that does not exceed the predetermined threshold for user distance from the computing system. In some examples, updating the locked state of the computing system may include locking the computing system in response to determining that the proximity of user to the computing system exceeds a predetermined threshold for user distance from the computing system.

In one example, using the signal strength between the computing system and the mobile device to calculate the physical distance between the mobile device and the computing system may include calculating a physical distance that correlates to a proximity that falls below a predetermined threshold for proximity, using the signal strength and the parameter to recalculate the physical distance between the mobile device and the computing system may include calculating a physical distance that correlates to a proximity that does not fall below the predetermined threshold for proximity, and updating the locked state of the computing system may include avoiding unlocking the computing system in response to calculating the physical distance that correlates to the proximity that does not fall below the predetermined threshold for proximity. In some examples, updating the locked state of the computing system may include unlocking the computing system in response to determining that the proximity of user to the computing system is below a predetermined threshold for proximity.

In one embodiment, the signal strength may include a received signal strength indication for a wireless technology standard for exchanging data over short distances. In some embodiments, the input from the at least one sensor on at least one of the computing system and the mobile device may include a measurement of time since a last action was taken by the user on the computing system. Additionally or alternatively, the input from the at least one sensor on at least one of the computing system and the mobile device may include input from the mobile device about a physical orientation of the mobile device.

In some examples, using the signal strength between the computing system and the mobile device to calculate the physical distance between the mobile device and the computing system may include monitoring the signal strength between the computing system and the mobile device. In one embodiment, calibrating, based on the input from the at least one sensor on at least one of the computing system and the mobile device that indicates an activity of the user, the parameter may include monitoring the input from the at least one sensor.

In some examples, calibrating, based on the input from the at least one sensor on at least one of the computing system and the mobile device that indicates an activity of the user, the parameter may include decreasing at least one threshold for the signal strength in response to receiving input from the at least one sensor indicating that the proximity of the user to the computing system is closer than expected by a previous threshold for the signal strength. Additionally or alternatively, calibrating, based on the input from the at least one sensor on at least one of the computing system and the mobile device that indicates an activity of the user, the parameter may include increasing at least one threshold for the signal strength in response to receiving input from the at least one sensor indicating that the proximity of the user to the computing system is farther than expected by a previous threshold for the signal strength.

In one embodiment, a system for implementing the above-described method may include (i) an identification module, stored in memory, that identifies a computing system and a mobile device that are both operated by a user, (ii) a calculation module, stored in memory, that uses a signal strength between the computing system and the mobile device to calculate a physical distance between the mobile device and the computing system that correlates to a proximity of the user to the computing system, (iii) a calibration module, stored in memory, that calibrates, based on input from at least one sensor on at least one of the computing system and the mobile device that indicates an activity of the user, a parameter for calculating the physical distance between the mobile device and the computing system based on the signal strength, (iv) the calculation module uses the signal strength and the parameter to recalculate the physical distance between the mobile device and the computing system that correlates to the proximity of the user to the computing system, (v) an updating module, stored in memory, that updates, based at least in part on the recalculated physical distance between the mobile device and the computing system, a locked state of the computing system in response to a change in the proximity of the user to the computing system, and (vi) at least one physical processor configured to execute the identification module, the calculation module, the calibration module, and the updating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a computing system and a mobile device that are both operated by a user, (ii) use a signal strength between the computing system and the mobile device to calculate a physical distance between the mobile device and the computing system that correlates to a proximity of the user to the computing system, (iii) calibrate, based on input from at least one sensor on at least one of the computing system and the mobile device that indicates an activity of the user, a parameter for calculating the physical distance between the mobile device and the computing system based on the signal strength, (iv) use the signal strength and the parameter to recalculate the physical distance between the mobile device and the computing system that correlates to the proximity of the user to the computing system, and (v) update, based at least in part on the recalculated physical distance between the mobile device and the computing system, a locked state of the computing system in response to a change in the proximity of the user to the computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
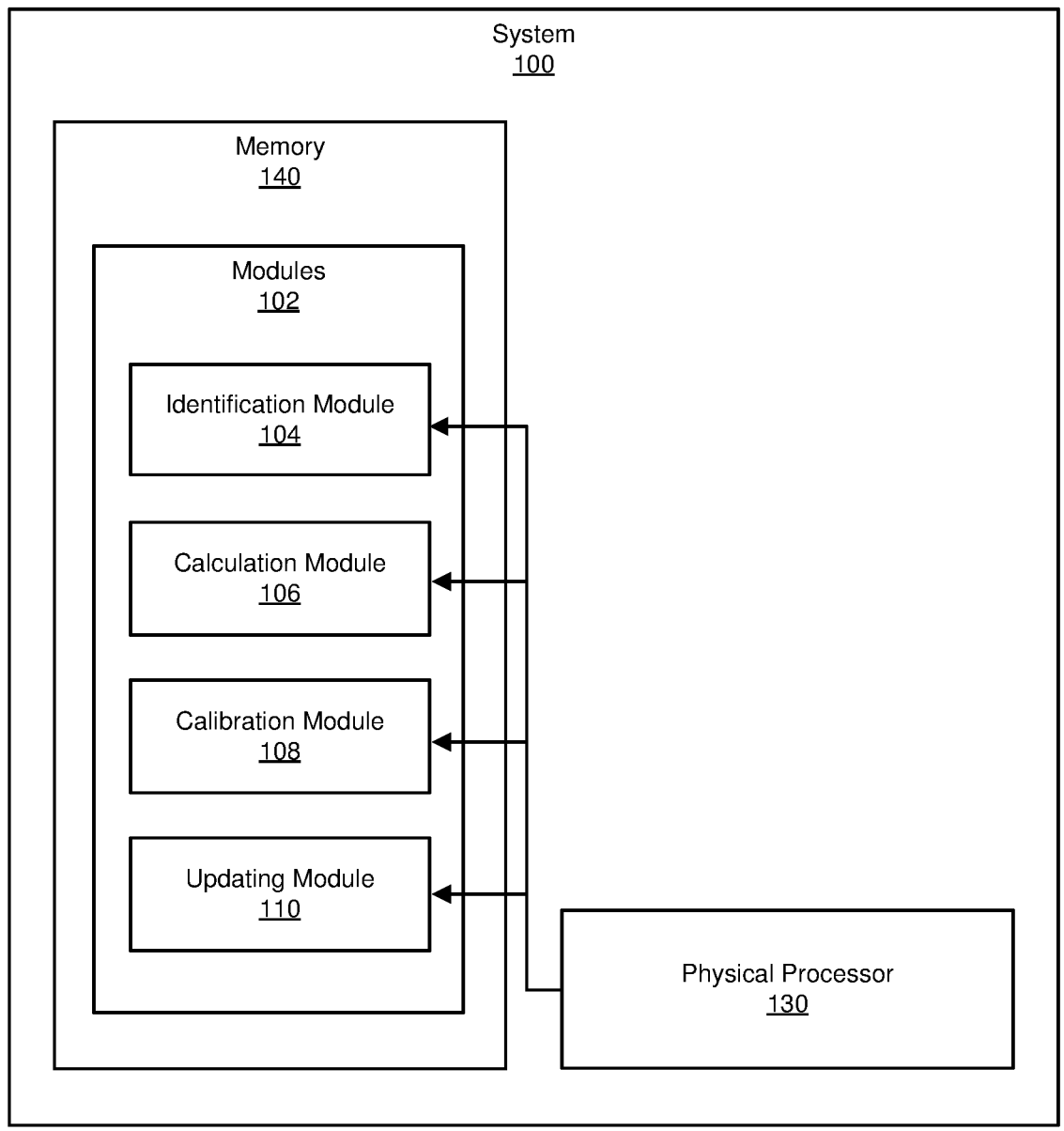
FIG. 1 is a block diagram of an example system for updating locked states.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for updating locked states. As will be explained in greater detail below, by using sensor data to refine a threshold for signal strength that is used to lock or unlock a computing system, the systems and methods described herein may be able to provide accurate proximity-based locking and unlocking for users. By using sensor data in addition to signal strength data, the systems and methods described herein may improve the accuracy of the proximity detection calculations, thereby reducing the number of resulting false positives and/or false negatives that may inappropriately lock or unlock a computing system. In addition, the systems and methods described herein may improve the functioning of a computing device by improving the security of the device by more accurately locking the computing device when the user is no longer present (and/or by not inaccurately unlocking the computing device when the user is not present) and/or may improve the convenience of the device by more accurately unlocking the computing device when the user is present. Furthermore, the systems and methods described herein may improve the functioning of a computing device by not inappropriately locking the computing device when the user is present, thereby potentially interfering with the legitimate operation of the computing device.

Figure 2:
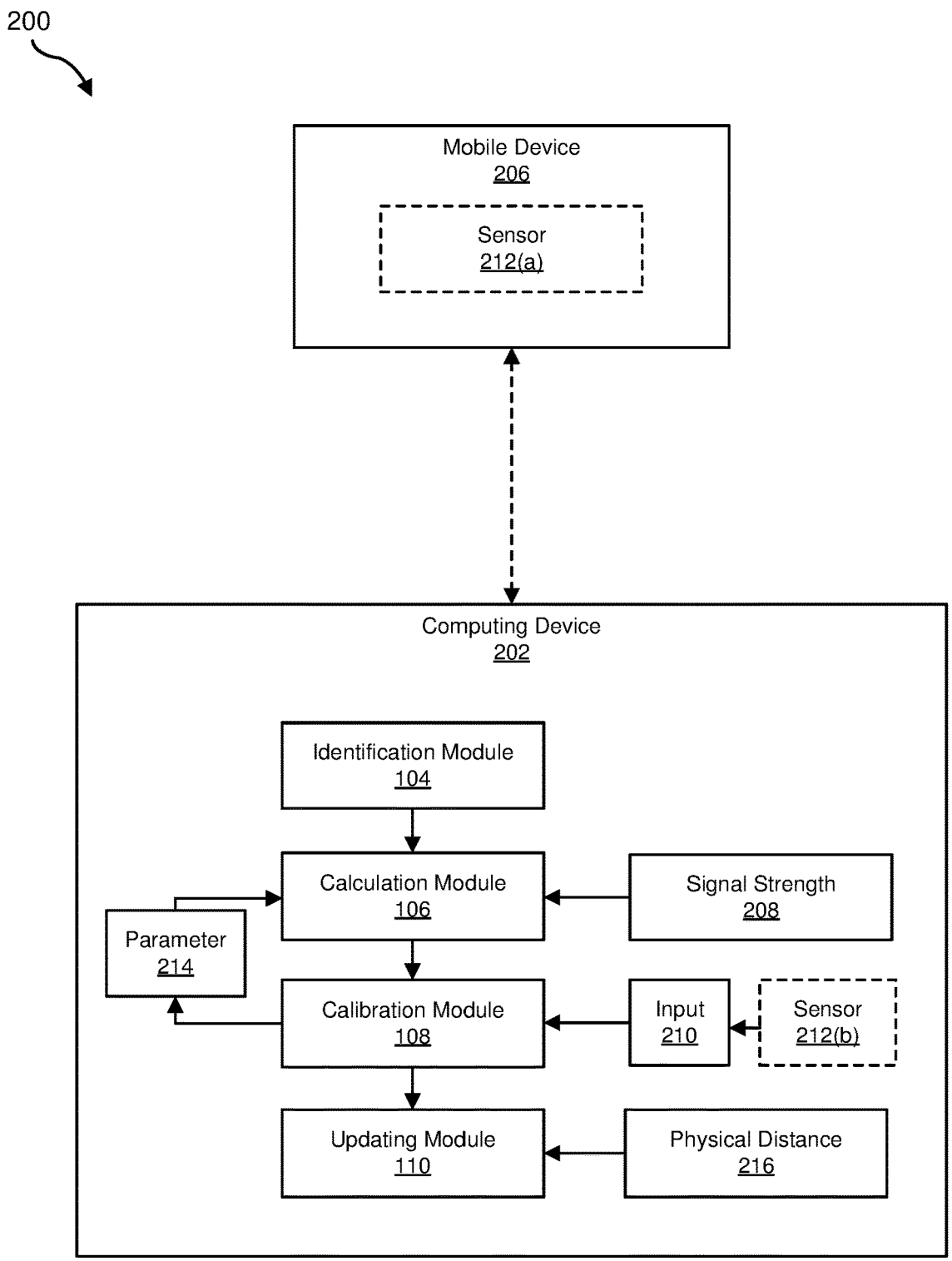
FIG. 2 is a block diagram of an additional example system for updating locked states.
Figure 3:
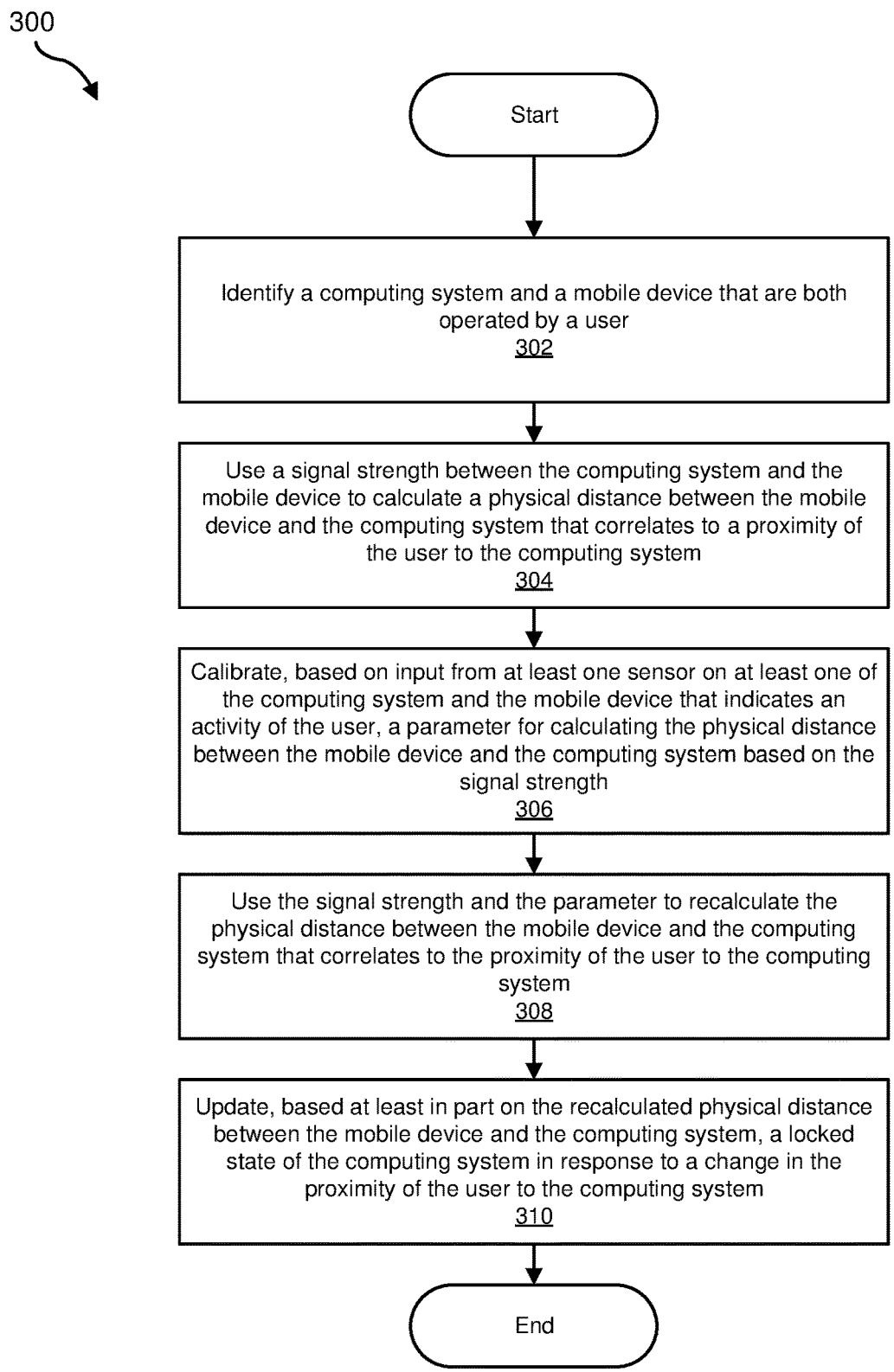
FIG. 3 is a flow diagram of an example method for updating locked states.
Figure 4:
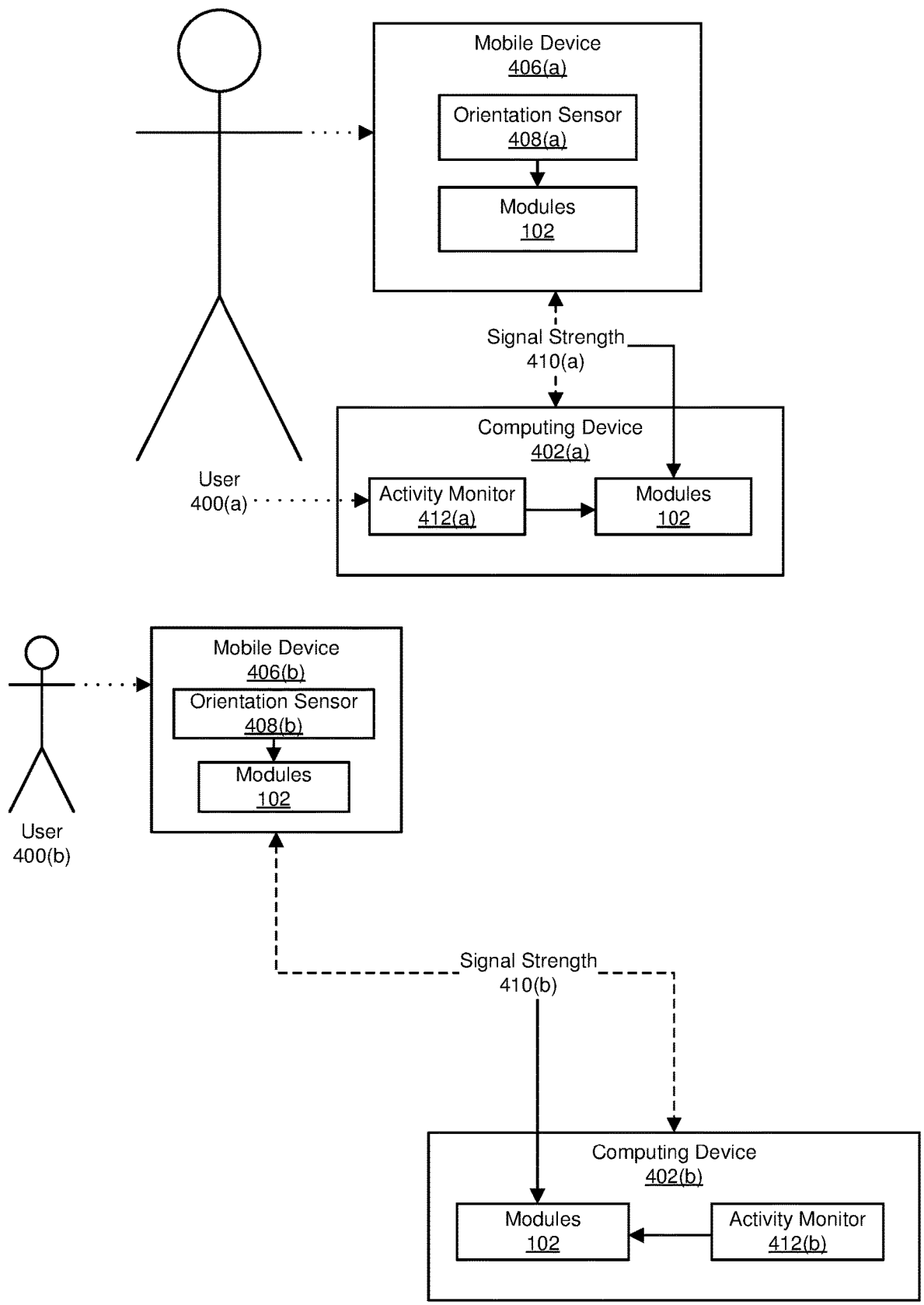
FIG. 4 is a block diagram of an additional example computing system for updating locked states.

The following will provide, with reference to FIGS. 1, 2, and 4, detailed descriptions of example systems for updating locked states. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of example system 100 for updating locked states. As illustrated in this figure, example system 100 may include one or more modules 102 for performing one or more tasks. For example, and as will be explained in greater detail below, example system 100 may include an identification module 104 that identifies a computing system and a mobile device that are both operated by a user. Example system 100 may additionally include a calculation module 106 that uses a signal strength between the computing system and the mobile device to calculate a physical distance between the mobile device and the computing system that correlates to a proximity of the user to the computing system. Example system 100 may also include a calibration module 108 that calibrates, based on input from at least one sensor on at least one of the computing system and the mobile device that indicates an activity of the user, a parameter for calculating the physical distance between the mobile device and the computing system based on the signal strength.

Calculation module 106 may also use the signal strength and the parameter to recalculate the physical distance between the mobile device and the computing system that correlates to the proximity of the user to the computing system. Example system 100 may additionally include an updating module 110 that updates, based at least in part on the recalculated physical distance between the mobile device and the computing system, a locked state of the computing system in response to a change in the proximity of the user to the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or mobile device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate updating locked states. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a mobile device 206. In one example, all or a portion of the functionality of modules 102 may be performed by computing device 202, mobile device 206, and/or any other suitable computing system. As will be described in greater detail below, one or more of modules 102 from FIG. 1 may, when executed by at least one processor of computing device 202 and/or mobile device 206, enable computing device 202 and/or mobile device 206 to update a locked state of a computing system. For example, and as will be described in greater detail below, identification module 104 may identify computing device 202 and mobile device 206 that are both operated by a user. Periodically, constantly, and/or at regular intervals, calculation module 106 may use a signal strength 208 between computing device 202 and mobile device 206 to calculate a physical distance 216 between mobile device 206 and computing device 202 that correlates to a proximity of the user to computing device 202. Next, calibration module 108 may calibrate, based on input 210 from at least one sensor 212(*a*) and/or 212(*b*) on at least one of computing device 202 and mobile device 206 that indicates an activity of the user, a parameter 214 for calculating physical distance 216 between mobile device 206 and computing device 202 based on signal strength 208. In some examples, calculation module 106 may use signal strength 208 and parameter 214 to recalculate physical distance 216 between mobile device 206 and computing device 202 that correlates to the proximity of the user to computing device 202. Depending on the result of the calculation, updating module 110 may update, based at least in part on the recalculated physical distance 216 between mobile device 206 and compute device 202, a locked state of computing device 202 in response to a change in the proximity of the user to computing device 202.

Computing device 202 generally represents any type or form of computing device capable of reading computer-executable instructions. In some embodiments, computing device 202 may be a personal computing device and/or computing system. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Mobile device 206 generally represents any type or form of computing device that is typically carried on a user's person. In one embodiment, mobile device 206 may be a smartphone. Additional examples of mobile device 206 include, without limitation, laptops, tablets, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, variations or combinations of one or more of the same, and/or any other suitable computing device.

Signal strength 208 generally represents any type or form of measurement of a strength of a wireless signal between two devices. Input 210 generally represents any type or form of data generated by a sensor. Sensor 212(a) and/or 212(b) generally represent any type or form of sensors that are capable of tracking and/or providing data about a user and/or computing system. Parameter 214 generally represents any variable in a calculation and/or evaluation. Physical distance 216 generally represents any representation of a distance in absolute, relative, numerical, categorical, and/or other terms.

FIG. 3 is a flow diagram of an example computer-implemented method 300 for updating locked states. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a computing system and a mobile device that are both operated by a user. For example, identification module 104 may, as part of computing device in FIG. 2, identify a computing device 202 and mobile device 206 that are both operated by a user.

The term "operated by," as used herein, generally refers to any legitimate and/or expected physical interaction between a user and a computing device and/or computing system. For example, a computing system being "operated by" a user may refer to the user having account on the computing system and/or being logged into the computing system. In some examples, a computing system may be operated by multiple users that each have a user account on the computing system. In this example, the computing system may be operated by the user who is currently actively using the computing system. In some examples, a computing system and/or device being "operated by" a user may refer to a computing device (e.g., a mobile device) that is being worn and/or carried by the user. For example, a user may be wearing a smart watch and/or carrying a mobile phone in their pocket and/or bag.

Identification module 104 may identify the computing system and mobile device in a variety of ways. For example, identification module 104 may receive input from a user identifying the computing system and/or mobile device as being operated by the user. In another example, identification module 104 may identify devices that are paired via a wireless data transfer technology such as BLUETOOTH and/or BLUETOOTH LOW ENERGY. Additionally or alternatively, identification module 104 may be part of a service that may identify user accounts for the same user on both the computing system and the mobile device.

At step 304, one or more of the systems described herein may use a signal strength between the computing system and the mobile device to calculate a physical distance between the mobile device and the computing system that correlates to a proximity of the user to the computing system. For example, calculation module 106 may, as part of computing device in FIG. 2, use signal strength 208 between computing device 202 and mobile device 206 to calculate physical distance 216 between mobile device 206 and computing device 202 that correlates to a proximity of the user to computing device 202.

The term "signal strength," as used herein, generally refers to any measurement of the power of a wireless and/or radio signal received by a computing device and/or computing system from another device. In one embodiment, the signal strength may include a received signal strength indication (RSSI) for a wireless technology standard for exchanging data over short distances. For example, the signal strength may be an RSSI for a BLUETOOTH signal and/or a BLUETOOTH LOW ENERGY signal. In other examples, the signal strength may be an RSSI for a different near-field communication standard. In some embodiments, the signal strength may be a moving average of the strength of the signal. In some embodiments, a high signal strength may indicate that the computing system is close to the mobile device while a low signal strength may indicate that the computing system is far from the mobile device. In other embodiments, signal strength may be measured in the inverse and a higher value for signal strength may indicate increased distance between two devices.

The term "proximity," as used herein, generally refers to a measurement of a physical distance between a user and a computing system. In some embodiments, the systems described herein may measure proximity in numerical units. For example, the systems described herein may measure proximity in integers. In other embodiments, the systems described herein may measure proximity in categories. For example, the systems described herein may measure proximity in the categories of "next to device," "near device," and/or "absent from device." Additionally or alternatively, the systems described herein may measure proximity in categories such as, "in range to use computing system" and/or "out of range to use computing system." In one embodiment, proximity may include a measurement of direction of travel. For example, the systems described herein may categorize a user moving toward a computing system as having a different proximity from when the user is the same distance away but is not moving and/or is moving away from the computing system.

Calculation module 106 may calculate the physical distance using the signal strength in a variety of ways. In some embodiments, calculation module 106 may obtain a measurement of the signal strength from a hardware component of the mobile device and/or the computing system. In one embodiment, calculation module 106 may obtain an RSSI from a wireless networking card of the computing system. In another embodiment, calculation module 106 may obtain an RSSI from a BLUETOOTH chip within the computing system and/or the mobile device.

In some examples, calculation module 106 may calculate the physical distance to the computing device in numerical terms. For example, calculation module 106 may calculate the physical distance as a distance in meters, feet, inches, and/or centimeters. In other examples, calculation module 106 may calculate a physical distance in categories. In some embodiments, calculation module 106 may calculate whether a signal strength and/or physical distance falls below and/or above one or more thresholds. For example, calculation module 106 may calculate whether a signal strength and/or physical distance falls below a threshold for nearness to the computing system and/or above a threshold for distance from the computing system. In one embodiment, calculation module 106 may calculate a signal strength and/or physical distance relative to both a lower and an upper threshold.

In some embodiments, calculation module 106 may calculate the physical distance using one or more parameters in addition to the signal strength. For example, calculation module 106 may use information from sensors on the computing system and/or mobile device to calculate the physical distance.

In some examples, calculation module 106 may use the signal strength between the computing system and the mobile device to calculate the physical distance between the mobile device and the computing system by monitoring the signal strength between the computing system and the mobile device. For example, calculation module 106 may monitor the signal strength constantly and/or may check the signal strength at regular intervals.

At step 306, one or more of the systems described herein may calibrate, based on input from at least one sensor on at least one of the computing system and the mobile device that indicates an activity of the user, a parameter for calculating the physical distance between the mobile device and the computing system based on the signal strength. For example, calibration module 108 may, as part of computing device in FIG. 2, calibrate, based on input 210 from at least one sensor 212(*a*) and/or 212(*b*) on at least one of computing device 202 and/or mobile device 206 that indicates an activity of the user, parameter 214 for calculating physical distance 216 between mobile device 206 and computing device 202 based on signal strength 208.

The term "sensor," as used herein, generally refers to any hardware and/or software that measures, detects, and/or tracks events and/or states. In some examples, a sensor may track the physical position, orientation, and/or acceleration of a device. For example, a sensor may include an accelerometer in a mobile device. In other examples, a sensor may track the state of one or more applications on a computing system and/or peripherals connected to a computing system. For example, a sensor may track whether a user is currently using a mouse, touchpad, and/or keyboard to interact with a computing system and/or the time since the user last used the mouse, touchpad, and/or keyboard. Additionally or alternatively, a sensor may monitor an activity level of a user of a computing system. For example, a sensor may track the time since a user of a computing system last interacted with an application on the computing system. In some embodiments, a sensor may also monitor applications and/or files that may cause a user to appear idle while the user is still interacting with the computing system. For example, a sensor may track whether a user who has not recently taken any actions on a computing system currently has a movie file playing and/or a document file in focus and thus might still be passively interacting with the computing system by viewing the movie and/or document. In this example, a sensor that tracks user activity may categorize the user as active despite the user not having recently taken an action.

The term "activity," as used herein, generally refers to any action and/or lack of action taken by a user. In one example, an activity may include physically moving. In another example, an activity may include interacting with a computing system and/or mobile device. For example, an activity may include taking actions on a computing system. In one embodiment, the input from the sensor that indicates an activity of the user may include a measurement of time since the last action was taken by the user on the computing system. Additionally or alternatively, the input from the sensor that indicates an activity of the user may include input from the mobile device about a physical orientation of the mobile device.

Calibration module 108 may calibrate the parameter based on the input in a variety of ways. In some examples, the parameter may represent one or more thresholds for measuring signal strength. For example, the systems described herein may calculate a moving average of the RSSI of the mobile device at the computing system. In this example, the systems described herein may have an upper threshold that is the moving average plus a value and/or a lower threshold that is the moving average minus a value. For example, the upper threshold may be the moving average plus ten and/or the lower threshold may be the moving average minus five.

In some embodiments, if the moving average of the signal strength crosses the lower threshold, calibration module 108 may use information from one or more sensors to determine the state of the user. For example, if an accelerometer on the mobile device indicates that the mobile device has not changed orientation recently, the systems described herein may determine that the user has not moved away from the computing device despite the reduced signal strength implying that the user has moved. Additionally or alternatively, the systems described herein may check an idle time of the user and may determine that the user has recently taken an action on the computing system, implying that the user is still in proximity to the computing system. In some examples, calibration module 108 may calibrate the parameter by decreasing at least one threshold for the signal strength in response to receiving the input that indicates that the proximity of the user to the computing system is closer than expected by the previous threshold for the signal strength. For example, calibration module 108 may decrease the upper threshold and/or the lower threshold for signal strength.

Additionally or alternatively, calibration module 108 may calibrate, based on the input from at least one sensor that indicates the activity of the user, the parameter by increasing at least one threshold for the signal strength in response to receiving input indicating that the proximity of the user to the computing system is farther than expected based on the previous threshold for the signal strength. For example, an accelerometer in the mobile device may indicate that the mobile device has recently changed orientation, suggesting that the user has gotten up from a seated position and potentially moved away from the computing system. In this example, calibration module 108 may increase the upper threshold and/or the lower threshold for signal strength.

In some embodiments, calibration module 108 may compensate for fluctuating signal strength values by recalibrating one or both thresholds to center around the current moving average of the signal strength any time that the current moving average of the signal strength meets or exceeds the upper threshold. In other embodiments, calibration module 108 may compensate for fluctuating signal strength values by recalibrating one or both thresholds to center around the current moving average of the signal strength any time that the current moving average of the signal strength meets or passes below the lower threshold. In some embodiments, calibration module 108 may only recalibrate a threshold if input from one or more sensors indicates that the signal strength is not currently providing accurate information about the location of the user.

In one embodiment, calibration module 108 may monitor the input from at least one sensor. For example, calibration module 108 may monitor, constantly and/or at regular intervals, input from a sensor that detects the physical orientation of the mobile device and/or input from a sensor that detects the activity level of the user on the computing system. In other embodiments, calibration module 108 may only check input from one or more sensors if a change in signal strength indicates that the user may have moved.

In some embodiments, calibration module 108 may use attitude (rotation) values of sensor on a mobile device to detect the user movements. In some embodiments, an attitude sensor may provide the pitch, roll and yaw angle of the mobile device relative to the normal horizon. In some examples, the systems described herein may calculate the root sum square of these three values is to determine the relative orientation of the mobile device. In one embodiment, the systems described herein may fetch attitude data from the mobile continuously and send the attitude data across to the companion computing system. In some examples, systems described herein may calculate the difference of the root sum square value of the current reading and the previous reading and/or may maintain a moving average of this difference. In some embodiments, the systems described herein may update the moving average with every reading.

At step 308, one or more of the systems described herein may use the signal strength and the parameter to recalculate the physical distance between the mobile device and the computing system that correlates to the proximity of the user to the computing system. For example, calculation module 106 may, as part of computing device in FIG. 2, use signal strength 208 and parameter 214 to recalculate physical distance 216 between mobile device 206 and computing device 202 that correlates to the proximity of the user to computing device 202.

Calculation module 106 may use the signal strength and the parameter to recalculate the physical distance in a variety of ways. In some examples, calculation module 106 may re-interpret the signal strength indication based on data from one or more sensors. For example, if the signal strength appears to be weak but an accelerometer on the mobile device has not recorded any recent movement and/or an activity monitor on the computing system indicates that the user has recently interacted with the computing system, calculation module 106 may determine that the weak signal strength is a result of a fluctuating signal and not a result of the user moving away from the computing system and/or that the physical distance between the user and the computing system is closer than indicated by the signal strength alone. In another example, if the signal strength appears to be strong but an accelerometer on the mobile device has recorded recent movement and/or an activity monitor on the computing system indicates that the user has not recently interacted with the computing system, calculation module 106 may determine that the strong signal strength is a result of a fluctuating signal and not a result of the user being near the computing system and/or that the physical distance between the user and the computing system is farther than indicated by the signal strength alone.

In some embodiments, sensors on the mobile device and/or the computing system may help correct for false positives otherwise caused by fluctuating signal strength. For example, as illustrated in FIG. 4, a user 400(a) may operate both a mobile device 406(a) and a computing device 402(a). In one embodiment, an activity monitor 412(a) on computing device 402(a) may monitor activity by user 400(a) on computing device 402(a). Additionally or alternatively, an orientation sensor 408(a) on mobile device 406(a) may monitor the physical orientation of mobile device 406(a) to detect when mobile device 406(a), and by inference, user 400(a), changes position. Modules 102 may operate on computing device 402(a) and/or mobile device 406(a) and may also monitor a signal strength 410(a) between computing device 402(a) and mobile device 406(a). In some examples, signal strength 410(a) may drop and/or may cross a threshold for weak signal strength. Rather than immediately interpreting this weak signal strength to mean that user 400(a) has moved away from computing device 402(a), the systems described herein may factor in data from orientation sensor 408(a) and/or activity monitor 412(a). In one example, orientation sensor 408(a) may indicate that mobile device 406(a) has not recently changed orientation and/or activity monitor 412(a) may indicate that user 400(a) has recently engaged in activity with computing device 402(a). In this example, the systems described herein may interpret the information from orientation sensor 408(a) and/or activity monitor 412(a) to mean that user 400(a) is still in proximity to computing device 402(a), despite what signal strength 410(a) indicates. In some embodiments, the systems described herein may adjust one or more thresholds for signal strength 410(a) so that the current measurement of signal strength 410(a) no longer falls below the adjusted threshold for weak signal strength.

In another example, a user 400(b) may operate both a mobile device 406(b) that is equipped with an orientation sensor 408(b) and a computing device 402(b) that is configured with an activity monitor 412(b). In some examples, the systems described herein may detect that a signal strength 410(b) has fallen below a threshold for weak signal strength. In one example, the systems described herein may determine that orientation sensor 408(b) has detected a recent change in orientation of mobile device 406(b) and/or that activity monitor 412(b) has not recently detected activity by user 400(b) on computing device 402(b). In this example, the systems described herein may determine, based on signal strength 410(b) and data from orientation sensor 408(b) and/or activity monitor 412(b), that the physical distance between user 400(b) and computing device 402(b) has increased and/or that user 400(b) is not currently in proximity to computing device 402(b).

In some examples, the signal strength may not change, but the systems described herein may receive input from one or more sensors indicating that the user has moved. For example, the signal strength may be weak and may remain below a threshold for weak signal strength, but the accelerometer may indicate that the user has moved toward the computing system. In another example, the signal strength may be strong and may remain above a threshold for high signal strength, but the system idle time may indicate that the user has not recently interacted with the computing system and/or the accelerometer may indicate that the user has moved away from the computing system. In these examples, the systems described herein may determine that the physical proximity of the user to the computing system has changed despite the lack of change in the signal strength.

In some embodiments, the systems described herein may take various actions based on the recalculated physical distance. For example, the systems described herein may launch and/or terminate an application and/or service, open and/or close a file, play a sound, activate and/or deactivate a peripheral device, adjust settings on the computing system, and/or send a command to a peripheral device. In one example, the systems described herein may automatically load a user's saved setting profile for an application and/or for the computing system in response to detecting that the user is in close proximity to the computing system. For example, the systems described herein may adjust the sensitivity on a computer mouse connected to a computing system to the preferred sensitivity setting of a user who has just come within a close proximity of the computing system. In some embodiments, the systems described herein may take into account the proximity of multiple users. For example, the systems described herein may apply parental control filters to content viewed on the computing system in response to determining that a user with a parent account has just decreased their proximity to the computing device but a user with a child account is still in close proximity to the computing system.

Returning to FIG. 3, at step 310, one or more of the systems described herein may update, based at least in part on the recalculated physical distance between the mobile device and the computing system, a locked state of the computing system in response to a change in the proximity of the user to the computing system. For example, updating module 110 may, as part of computing device in FIG. 2, update, based at least in part on the recalculated physical distance 216 between mobile device 206 and computing device 202, a locked state of computing device 202 in response to a change in the proximity of the user to computing device 202.

The term "locked state," as used herein, generally refers to any state that governs the accessibility of functions, data, applications, and/or a user account on a computing system. In some embodiments, a locked state may be one of two states: locked, where the computing system is fully inaccessible until the user has authenticated themselves to the system or unlocked, where the computing system is fully accessible. In other embodiments, a locked state may be an additional state on a continuum from fully locked to fully unlocked, such as the state of providing some data and/or functions that are accessible but requiring additional authentication information before providing accessibility to all functions of the computing system, being accessible for a limited amount of time and then becoming inaccessible unless authentication information is provided before the time limit, and/or any other suitable state of partial and/or limited accessibility of applications, functions, and/or data. Additionally or alternatively, a locked state may include an intermediate state between fully locked and fully unlocked such that an authentication factor for fully unlocking the computing system is weaker (e.g., more quickly and/or easily fulfilled by a user) than an authentication factor required for unlocking the computing system from the fully locked state.

Updating module 110 may update the locked state in a variety of ways and/or contexts. For example, updating module 110 may update the locked state of the computing system by locking the computing system in response to determining that the proximity of user to the computing system exceeds a predetermined threshold for user distance from the computing system. In another example, updating module 110 may update the locked state of the computing system by unlocking the computing system in response to determining that the proximity of user to the computing system is below a predetermined threshold for proximity. In some examples, updating module 110 may update the locked state of the computing system by confirming that the current locked state (e.g., locked or unlocked) remains the correct locked state. In some embodiments, updating module 110 may update the locked state of the computing system at regular intervals. In other embodiments, updating module 110 may only update the locked state of the computing system in response to a change in signal strength and/or sensor data.

Figure 5:
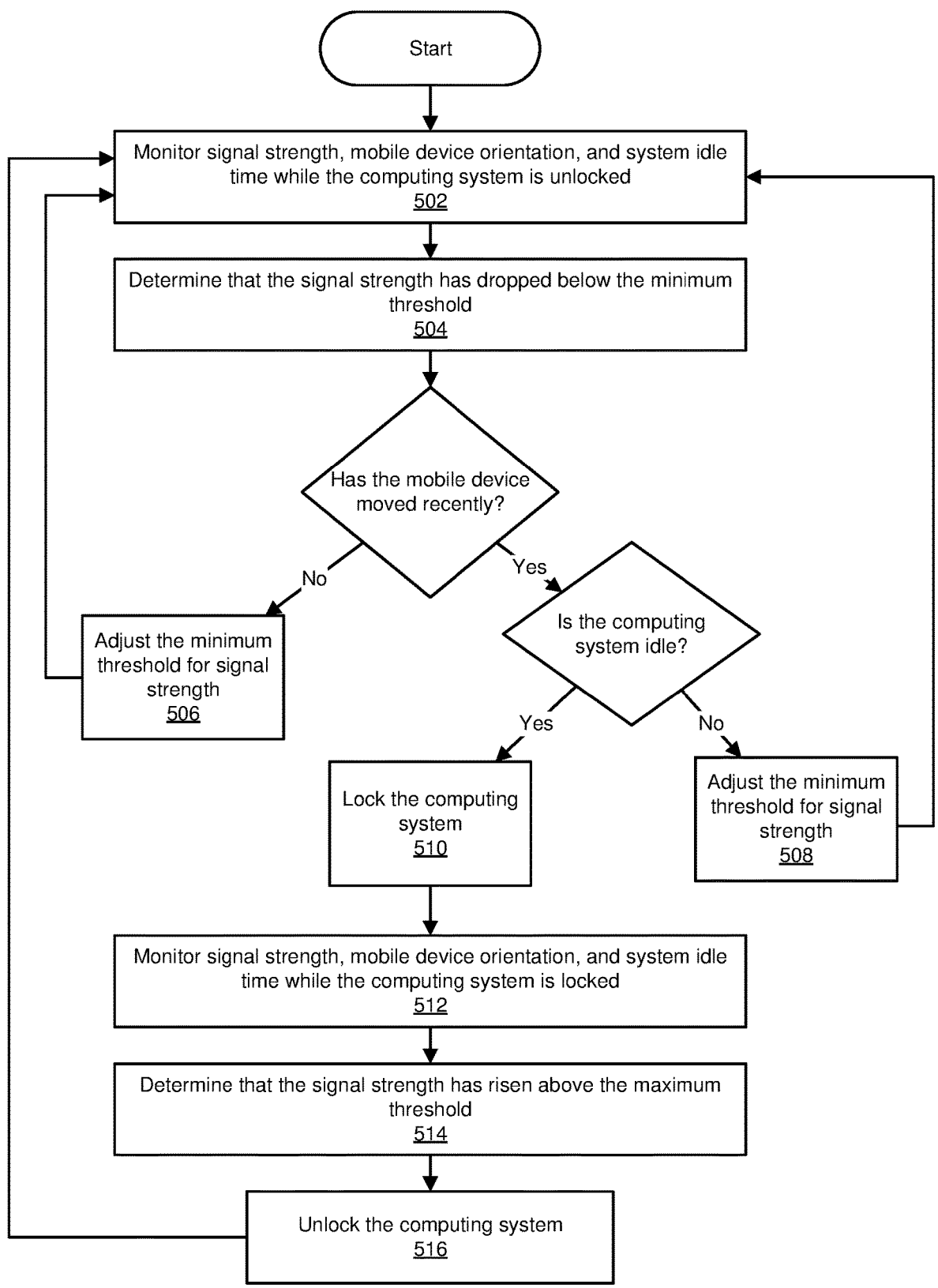
FIG. 5 is a flow diagram of an additional example method for updating locked states

In some embodiments, the systems described herein may use information from multiple sources to determine the correct current locked state for the computing system. For example, as illustrated in FIG. 5, at step 502, the systems described herein may monitor signal strength, mobile device orientation, and/or system idle time while the computing system is unlocked. At step 504, the systems described herein may determine that the signal strength has dropped below the minimum threshold for signal strength, potentially indicating that the systems described herein should lock the computing system. The systems described herein may determine, based on one or more sensor installed on the mobile device, whether the mobile device has moved recently. If the mobile device has not moved recently, suggesting that the user has not moved recently and is still in proximity to the computing system, at step 506 the systems described herein may adjust the minimum threshold for signal strength downward so that the current signal strength level is interpreted to indicate that the user is in proximity to the computing system. The systems described herein may then resume monitoring all relevant sources of proximity information.

If the mobile device has moved recently, the systems described herein may check whether the computing system is idle. If the computing system is not idle, suggesting that the user is interacting with the computing system and thus is near the computing system, at step 508 the systems described herein may adjust the minimum threshold for signal strength downward and may then resume monitoring. If the computing system is idle, the systems described herein may determine, based on the weak signal strength, the indication of movement from the mobile device, and the idleness of the computing system, that the user is not currently in proximity to the computing system and at step 510 the systems described herein may lock the computing system.

At step 512, the systems described herein may continue monitoring signal strength, mobile device orientation, and system idle time while the computing system is in the locked state. In some embodiments, the systems described herein may not monitor system idle time while the computing system is locked due to the infeasibility of a user interacting with a locked computing system and/or the intention of proactively unlocking the computing system before the user is forced to interact with the locked computing system (e.g., to enter authentication information). In some examples, at step 514, the systems described herein may determine that the signal strength has risen above the maximum threshold for signal strength, indicating that the user is in close proximity to the computing system. In some embodiments, the systems described herein may perform further checks on sensor data to determine whether the increased signal strength is a result of fluctuating signal strength rather than user movement. In other embodiments, the systems described herein may immediately proceed to step 516 and may unlock the computing system. The systems described herein may then continue monitoring the signal strength and sensors while the computing device is in the unlocked state. In some embodiments, the systems described herein may follow a different flow than that illustrated in FIG. 5. For example, the systems described herein may consult system idle time before consulting mobile device orientation.

In some examples, the systems described herein may, by using data from sensors, enable locking systems to avoid locking a computing system in response to false positives based solely on signal strength. In other examples, the systems described herein may, by using data from sensors, enable locking systems to avoid unlocking a computing system in response to false negatives based solely on signal strength. In other examples, the data from the sensors may agree with the data from the signal strength.

As explained in connection with method 300 above, the systems and methods described herein may accurately define a user's proximity a computing system by using RSSI values, mobile motion sensor values, and/or system idle time. Because there can be rapid fluctuations in the RSSI values, instead of raw values, the systems described herein may use a moving average of the received signal strength. In some embodiments, the systems described herein may establish two threshold limits, an upper threshold composed of the initial moving average plus a constant and lower threshold composed of the initial moving average minus a constant. Whenever the moving average value crosses the upper limit, the systems described herein may check the sensor data to determine the user state. If the moving average reaches the lower limit, the systems described herein may re-calibrate the threshold values based on the current moving average. This automatic readjustment of threshold may minimize errors due to fluctuating signal values. By using three parameters, rather than just one, to determine the use's proximity to computing system, the systems described herein may reduce false positives for a proximity auto-lock system. The combination of parameters may not only help to minimize false positives but also false negatives. By accurately automatically locking and unlocking a computing system based on user proximity, the systems described herein may prevent unauthorized access to the computing system while providing convenience for the user.

Figure 6:
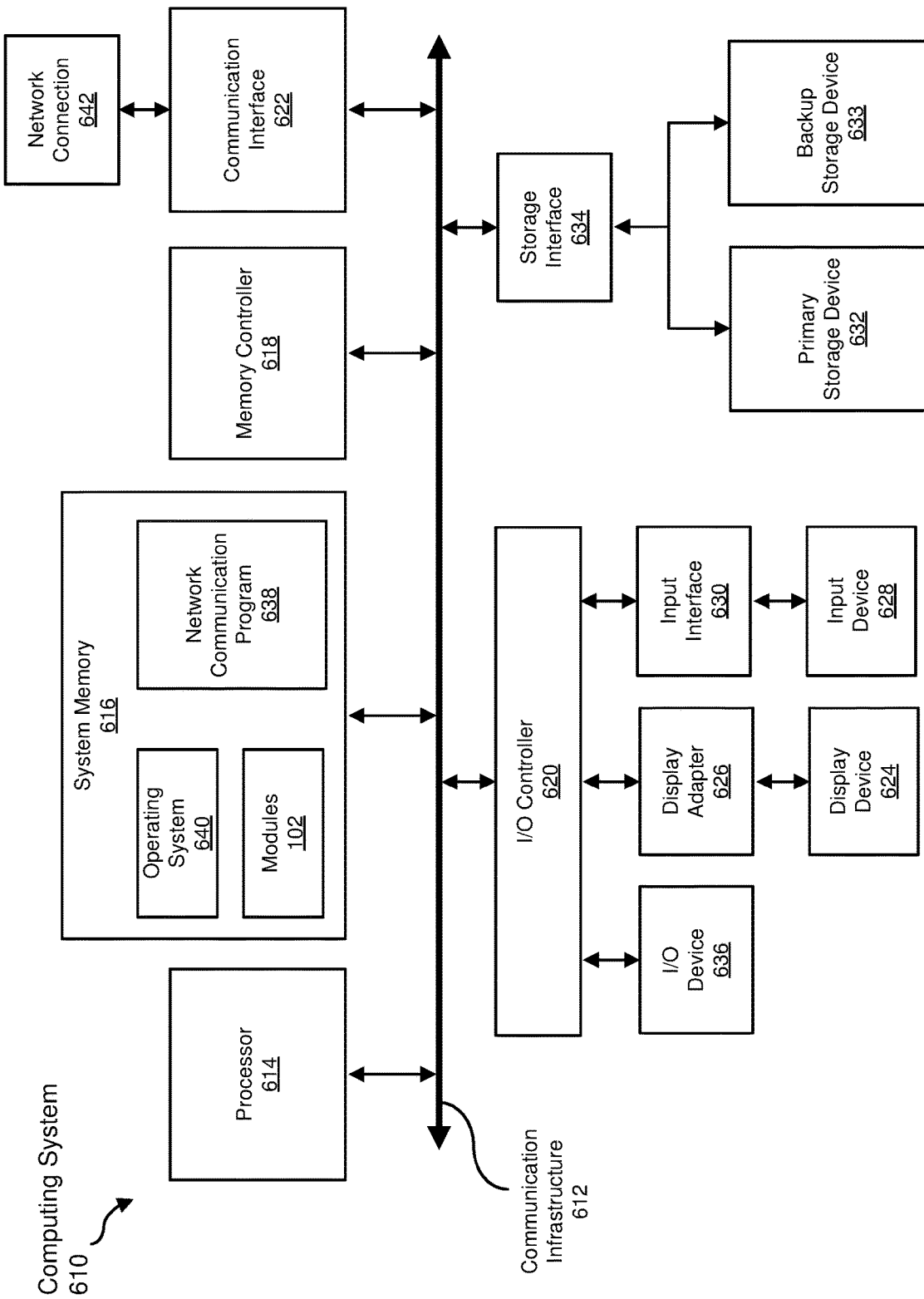
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
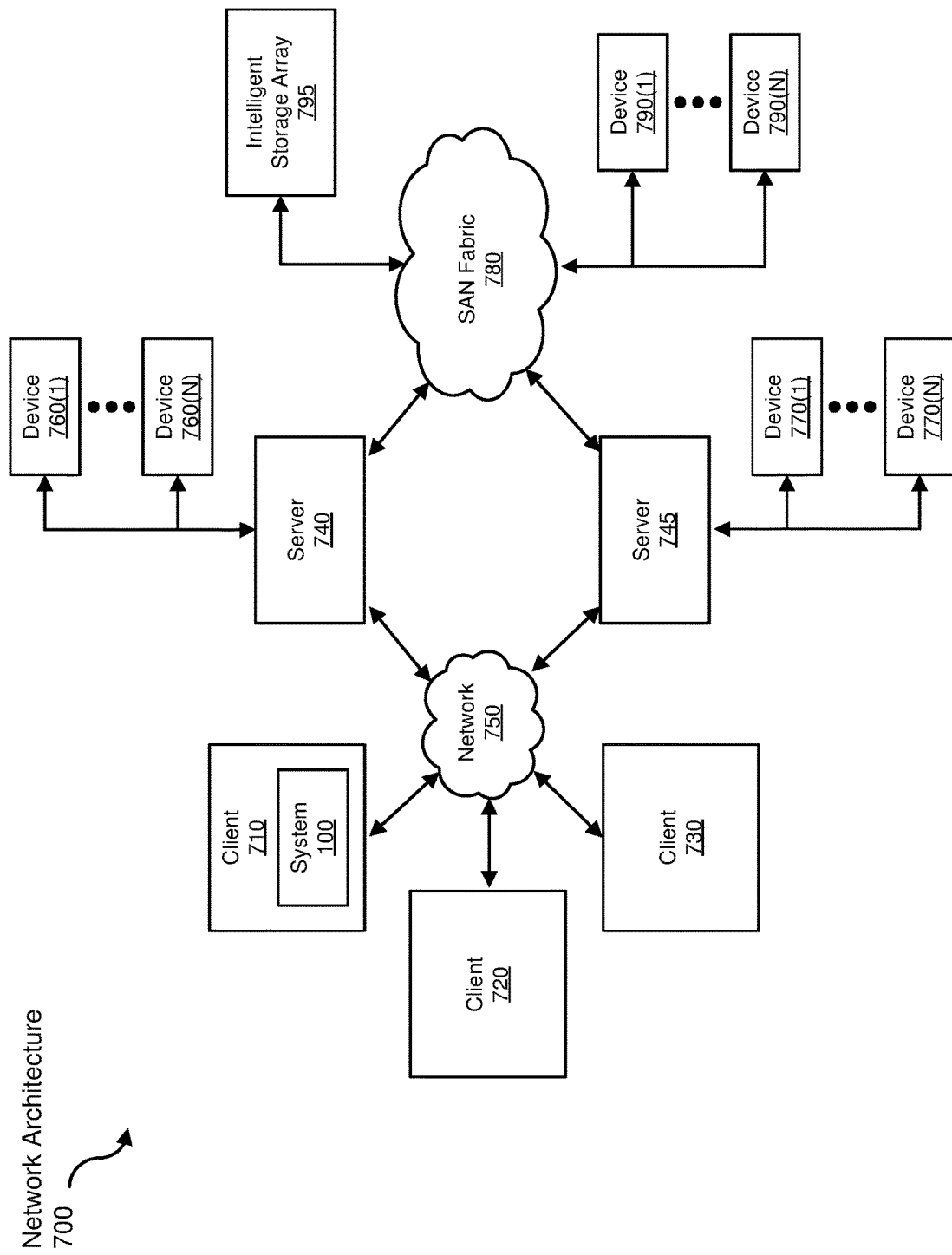
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for updating locked states.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive sensor data to be transformed, transform the sensor data into a proximity calculation, output a result of the transformation to memory, use the result of the transformation to calculate proximity, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating locked states, at least a portion of the method being performed by a computing device comprising at least one processor, the method comprising:

identifying a computing system and a mobile device that are both operated by a user;

calculating a physical distance between the mobile device and the computing system using a signal strength between the computing system and the mobile device;

correlating the physical distance to a first proximity of the user to the computing system;

receiving data from at least one sensor on at least one of the computing system and the mobile device;

recalculating the physical distance between the mobile device and the computing system;

comprising applying a threshold to the signal strength, the threshold being based at least in part on the received data from the at least one sensor;

correlating the recalculated physical distance to a second proximity of the user to the computing system; and updating a locked state of the computing system based at least in part on the second proximity of the user being different from the first proximity of the user.

2. The computer-implemented method of claim 1, wherein:

the physical distance that correlates to the first proximity of the user to the computing system exceeds a predetermined threshold for a distance of the user from the computing system;

the recalculated physical distance that correlates to the second proximity of the user to the computing system does not exceed the predetermined threshold for the distance of the user from the computing system; and updating the locked state of the computing system based at least in part on the second proximity of the user being different from the first proximity of the user comprises avoiding locking the computing system.

3. The computer-implemented method of claim 1, wherein:

the first proximity falls below a predetermined threshold for a proximity of the user to the computing system;

the second proximity does not fall below the predetermined threshold for the proximity of the user to the computing system; and updating the locked state of the computing system based at least in part on the second proximity of the user being different from the first proximity of the user comprises avoiding unlocking the computing system based on the second proximity not falling below the predetermined threshold for the proximity of the user to the computing system.

4. The computer-implemented method of claim 1, wherein updating the locked state of the computing system based at least in part on the second proximity of the user being different from the first proximity of the user comprises locking the computing system in response to determining that the second proximity of the user to the computing system exceeds a predetermined threshold for a proximity of the user to the computing system.

5. The computer-implemented method of claim 1, wherein updating the locked state of the computing system based at least in part on the second proximity of the user being different from the first proximity of the user comprises unlocking the computing system in response to determining that the second proximity of the user to the computing system is below a predetermined threshold for a proximity of the user to the computing system.

6. The computer-implemented method of claim 1, wherein the signal strength comprises a received signal strength indication for a wireless technology standard for exchanging data over short distances.

7. The computer-implemented method of claim 1, wherein the data from the at least one sensor on at least one of the computing system and the mobile device comprises a measurement of time since a last action was taken by the user on the computing system.

8. The computer-implemented method of claim 1, wherein the data from the at least one sensor on at least one of the computing system and the mobile device comprises input from the mobile device about a physical orientation of the mobile device.

9. The computer-implemented method of claim 1, wherein calculating the physical distance between the mobile device and the computing system using the signal strength between the computing system and the mobile device comprises monitoring the signal strength between the computing system and the mobile device.

10. The computer-implemented method of claim 1, wherein receiving data from at least one sensor on at least one of the computing system and the mobile device comprises monitoring input from the at least one sensor.

11. The computer-implemented method of claim 1, wherein a previous threshold for applying to the signal strength is associated with a previous proximity of the user to the computing system; and wherein basing the threshold at least in part on the received data from the at least one sensor comprises decreasing the previous threshold based on the received data from the at least one sensor indicating that a proximity of the user to the computing system is closer than the previous proximity of the user to the computing system.

12. The computer-implemented method of claim 1, wherein a previous threshold for applying to the signal strength is associated with a previous proximity of the user to the computing system; and wherein basing the threshold at least in part on the received data from the at least one sensor comprises increasing the previous threshold based on the received data from the at least one sensor indicating that a proximity of the user to the computing system is farther than the previous proximity of the user to the computing system.

13. A system for updating locked states, the system comprising:

an identification module, stored in memory, that identifies a computing system and a mobile device that are both operated by a user;

a calculation module, stored in memory, that calculates a physical distance between the mobile device and the computing system using a signal strength between the computing system and the mobile device, and that correlates the physical distance to a first proximity of the user to the computing system;

a calibration module, stored in memory, that receives data from at least one sensor on at least one of the computing system and the mobile device, and that bases a threshold on the received data;

the calculation module recalculating the physical distance between the mobile device and the computing system by applying the threshold to the signal strength; and correlating the recalculated physical distance to a second proximity of the user to the computing system;

an updating module, stored in memory, that updates a locked state of the computing system based at least in part on the second proximity of the user being different than the first proximity of the user; and at least one physical processor configured to execute the identification module, the calculation module, the calibration module, and the updating module.

14. The system of claim 13, wherein:

the physical distance that correlates to the first proximity of the user to the computing system exceeds a predetermined threshold for a distance of the user from the computing system;

the recalculated physical distance that correlates to the second proximity of the user to the computing system does not exceed the predetermined threshold for the distance of the user from the computing system; and the updating module updating the locked state of the computing system based at least in part on the second proximity of the user being different from the first proximity of the user comprises avoiding locking the computing system.

15. The system of claim 13, wherein:

the first proximity falls below a predetermined threshold for a proximity of the user from the computing system;

the second proximity does not fall below the predetermined threshold for the proximity of the user to the computing system; and the updating module updates the locked state of the computing system based at least in part on the second proximity of the user being different from the first proximity of the user by avoiding unlocking the computing system based on the second proximity not falling below the predetermined threshold for the proximity of the user to the computing system.

16. The system of claim 13, wherein the updating module updates the locked state of the computing system based at least in part on the second proximity of the user being different from the first proximity of the user by locking the computing system in response to determining that the second proximity of the user to the computing system exceeds a predetermined threshold for a proximity of the user to the computing system.

17. The system of claim 13, wherein the updating module updates the locked state of the computing system based at least in part on the second proximity of the user being different from the first proximity of the user by unlocking the computing system in response to determining that the second proximity of the user to the computing system is below a predetermined threshold for a proximity of the user to the computing system.

18. The system of claim 13, wherein the signal strength comprises a received signal strength indication for a wireless technology standard for exchanging data over short distances.

19. The system of claim 13, wherein the data from the at least one sensor on at least one of the computing system and the mobile device comprises a measurement of time since a last action was taken by the user on the computing system.

20. A non-transitory computer-readable medium comprising one or more computer-readable instructions that, when executed by at least one processor of a computing device, cause the computing device to:

identify a computing system and a mobile device that are both operated by a user;

calculate a physical distance between the mobile device and the computing system using a signal strength between the computing system and the mobile device;

correlate the physical distance to a first proximity of the user to the computing system;

receive data from at least one sensor on at least one of the computing system and the mobile device;

recalculate the physical distance between the mobile device and the computing system comprising applying a threshold to the signal strength, the threshold based on the received data from the at least one sensor;

correlate the recalculated physical distance to a second proximity of the user to the computing system; and update a locked state of the computing system based at least in part on the second proximity of the user being different from the first proximity of the user.

\* \* \* \* \*